(12) United States Patent
Sajassi et al.

(10) Patent No.: US 10,681,425 B2
(45) Date of Patent: Jun. 9, 2020

(54) DYNAMIC DESIGNATED FORWARDER ELECTION PER MULTICAST STREAM FOR EVPN ALL-ACTIVE HOMING

(71) Applicant: Cisco Technology, Inc., San Jose, CA (US)

(72) Inventors: Ali Sajassi, San Ramon, CA (US); Samir Thoria, Saratoga, CA (US); Tapraj Singh, San Ramon, CA (US); Mankamana Prasad Mishra, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 15/827,376

(22) Filed: Nov. 30, 2017

(65) Prior Publication Data

US 2019/0166407 A1 May 30, 2019

(51) Int. Cl.
*H04N 21/6405* (2011.01)
*H04L 12/46* (2006.01)
(Continued)

(52) U.S. Cl.
CPC ..... *H04N 21/6405* (2013.01); *H04L 12/4641* (2013.01); *H04L 65/4076* (2013.01); *H04N 21/222* (2013.01); *H04N 21/2402* (2013.01); *H04N 21/2405* (2013.01); *H04W 8/005* (2013.01)

(58) Field of Classification Search
CPC ........... H04N 21/6405; H04N 21/2405; H04N 21/222; H04N 21/2402; H04L 65/4076; H04L 12/4641; H04W 8/005
See application file for complete search history.

(56) References Cited

U.S. PATENT DOCUMENTS 9,071,546 B2 6/2015 Cai et al.
9,628,409 B1 * 4/2017 Yuvaraj ................. H04L 49/201
(Continued)

OTHER PUBLICATIONS

David G. Thaler, et al., "A Name-Based Mapping Scheme for Rendezvous", Electrical Engineering and Computer Science Department, The University of Michigan, Ann Arbor, Michigan, Nov. 13, 1996, 31 pages.
(Continued)

*Primary Examiner* — Uzma Alam
(74) *Attorney, Agent, or Firm* — Edell, Shapiro & Finnan, LLC

(57) ABSTRACT

A method is performed by a first provider edge (PE) of a redundancy group including provider edges configured with an Ethernet virtual private network (EVPN) segment identifier (EVI) and an Ethernet segment identifier (ESI) and that are multi-homed to a customer edge (CE). The method includes, upon receiving from the CE a join request including a group address for a multicast stream, electing a designated forwarder (DF) for the multicast stream. The electing includes: computing for each PE a respective affinity for the DF as a function of a respective address of the PE, the EVI, and the group address; and determining which PE has a largest affinity. The method further includes, if the first PE has the largest affinity or does not have the largest affinity, configuring the first PE as the designated forwarder or not configuring the first PE as the designated forwarder for the multicast stream, respectively.

20 Claims, 8 Drawing Sheets

(51) Int. Cl.
  *H04L 29/06* (2006.01)
  *H04N 21/24* (2011.01)
  *H04N 21/222* (2011.01)
  *H04W 8/00* (2009.01)

(56) References Cited

U.S. PATENT DOCUMENTS

| | | | | |
|---|---|---|---|---|
| 10,250,399 | B1* | 4/2019 | Banerjee | H04L 12/18 |
| 2011/0213887 | A1* | 9/2011 | Hernanz | H04L 65/4069 |
| | | | | 709/227 |
| 2018/0091445 | A1* | 3/2018 | Singh | H04L 12/4633 |
| 2019/0197136 | A1* | 6/2019 | Meron | G06F 16/27 |

OTHER PUBLICATIONS

A. Sajassi, Ed., et al., "BGP MPLS-Based Ethernet VPN", Internet Engineering Task Force (IETF), ISSN: 2070-1721, RFC 7432, Feb. 2015, 56 pages.

Ali Sajassi, et al., "IGMP and MLD Proxy for EVPN", draft-sajassi-bess-evpn-igmp-mld-proxy-00, BESS Working Group, Internet-Draft, Oct. 17, 2015, 13 pages.

R. Aggarwal, et al., "BGP MPLS Based Ethernet VPN", draft-raggarwa-sajassi-l2vpn-evpn-00.txt, Network Working Group, Internet Draft, Oct. 18, 2010, 41 pages.

Ali Sajassi, et al., "IGMP and MLD Proxy for EVPN", draft-sajassi-bess-evpn-igmp-mld-proxy-01, BESS Working Group, Internet-Draft, Oct. 28, 2016, 25 pages.

S. Mohanty, et al., "A new Designated Forwarder Election for the EVPN", draft-ietf-bess-evpn-df-election-02, BESS Working Group, Internet-Draft, Apr. 9, 2017, 15 pages.

S. Mohanty, et al., "A new Designated Forwarder Election for the EVPN", draft-mohanty-bess-evpn-df-election-00, BESS Working Group, Internet-Draft, Mar. 7, 2015, 11 pages.

A. Sajassi, et al., "BGP MPLS-Based Ethernet VPN", Internet Engineering Task Force (IETF), ISSN: 2070-1721, Feb. 2015, RFC 7432, 56 pages.

* cited by examiner

DYNAMIC DESIGNATED FORWARDER ELECTION PER MULTICAST STREAM FOR EVPN ALL-ACTIVE HOMING

TECHNICAL FIELD

The present disclosure relates to per multicast stream designated forwarder election in an EVPN.

BACKGROUND

Ethernet virtual private network (EVPN)-based all-active multi-homing has become a basic building block of next generation data center deployments as well as service provider access/aggregation networks. For an EVPN, Internet Engineering Task Force (IETF) Request for Comments (RFC) 7432 ("RFC 7432") defines a role of a designated forwarder (DF) as a provider edge (PE) or node in a redundancy group, i.e., a link aggregation group (LAG), of the EVPN that is responsible to forward broadcast/multicast traffic and unknown unicast traffic to customer edge (CE) in an all-active multi-homing mode. RFC 7432 describes a mechanism to elect the DF at a granularity of an Ethernet Segment Identifier (ESI) and an EVPN instance (EVI), collectively denoted as <ESI, EVI>, which equates to the granularity of a per-virtual local area network (VLAN) (or per group of VLANs in case of VLAN-aware bundle service); however, election of the DF at the conventional level of per-VLAN granularity is inadequate for many customers applications, which require DF election on a per multicast stream defined at a granularity level of a group address (G) and a source address (S) of the multicast stream. As a result, per-VLAN DF election severely under-utilizes the communication links between the customer edge and the PEs of a redundancy group in the EVPN. In a deployment scenario in which all multicast streams are configured for a single VLAN, conventional DF election always selects only one of the interfaces in all-active multi-homing, which defeats a main purpose of the all-active multi-homing, and prevents load balancing.

DESCRIPTION OF EXAMPLE EMBODIMENTS

Overview

In one embodiment, a method is performed at a first provider edge of a redundancy group including multiple provider edges that are configured with an Ethernet virtual private network (EVPN) segment identifier (EVI) and an Ethernet segment identifier (ESI) and that are multi-homed to a customer edge. The method includes, upon receiving from the customer edge a join request that includes a group address for a multicast stream, electing a designated forwarder for the multicast stream in the redundancy group. The electing includes: computing for each provider edge a respective affinity for the designated forwarder as a mathematical function of at least a respective address of the provider edge, an identifier corresponding to the EVI, and the group address; and determining which provider edge has a largest affinity among the affinities. The method further includes, if the first provider edge has the largest affinity or does not have the largest affinity, configuring the first provider edge as the designated forwarder or not configuring the first provider edge as the designated forwarder for the multicast stream, respectively. In an example, the join request includes an Internet Group Management Protocol (IGMP)/Multicast Listener Discovery (MLD) join (e.g., membership report), and the identifier corresponding to the EVI includes the EVI or a VLAN identifier.

Example Embodiments

Figure 1:
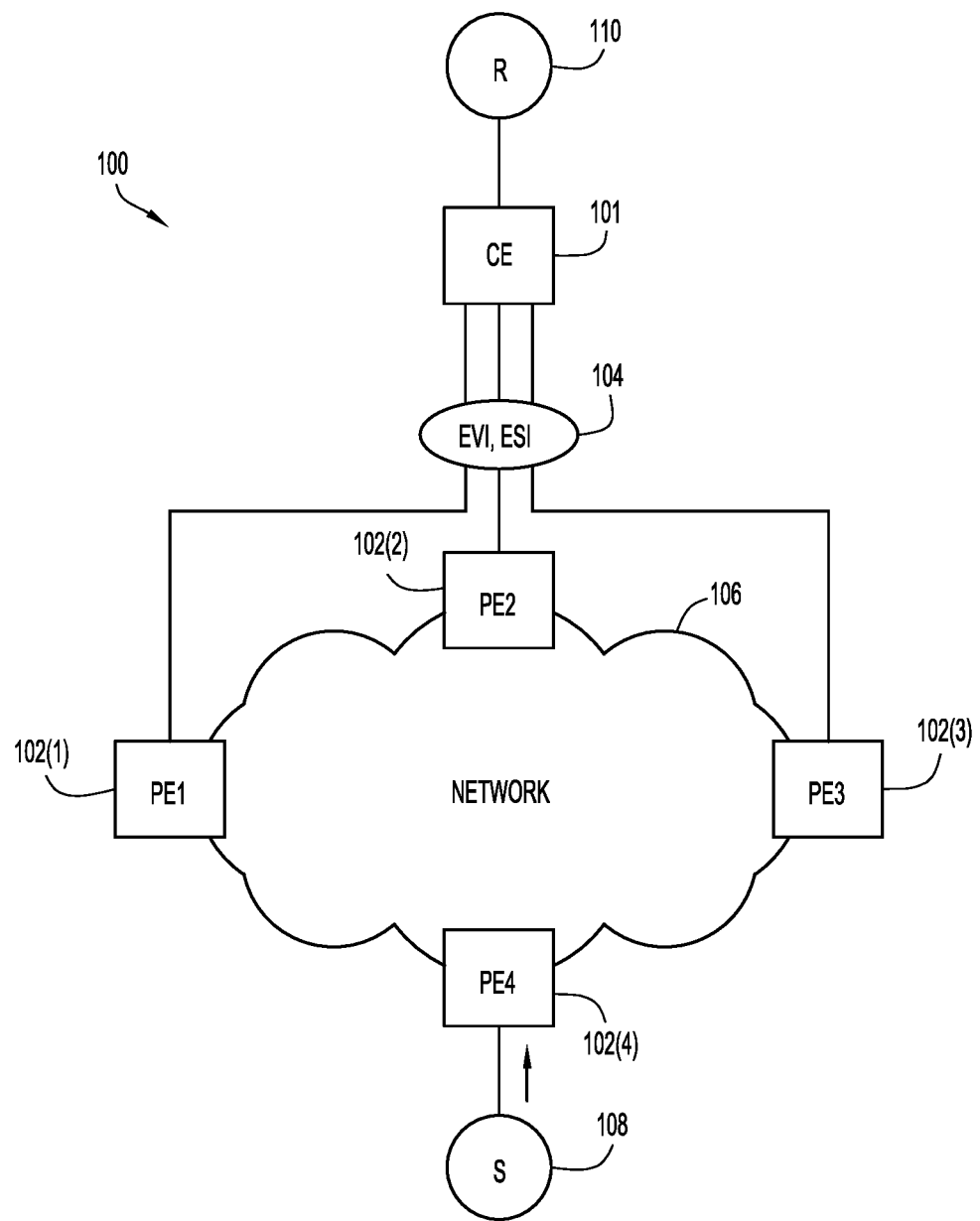
FIG. 1 is a block diagram of an EVPN instance in which dynamic DF election for EVPN all-active homing on a per-multicast stream basis may be implemented, according to an example embodiment.

With reference to FIG. 1, there is a block diagram of an EVPN instance 100 in which dynamic DF election for EVPN all-active homing on a per-multicast stream basis may be implemented. EVPN instance 100, uniquely identified using an EVPN identifier EVI, includes customer edge (CE) 101 connected to provider edges 102(1)-102(3) (also denoted as provider edges PE1-PE3) over respective Ethernet links among a set of Ethernet links 104. As part of EVPN instance 100, provider edges 102(1)-102(3) are each configured with the EVI. The EVI may also represent a VLAN identifier (VLAN ID) of the EVI, or one or more VLAN IDs for the EVI may be configured on each of provider edges 102(1)-102(3). For example, all multicast streams for the EVPN may be configured for a single VLAN or for multiple VLANs. The set of Ethernet links 104 collectively represent an "Ethernet segment" 104 in EVPN instance 100. Ethernet segment 104 is uniquely identified using an Ethernet Segment Identifier (ESI). Provider edges 102(1)-102(3) are each configured with the ESI. Provider edges 102(1)-102(3) form an edge of a Multiprotocol Label Switching (MPLS) infrastructure or network 106 (also referred to as a "core" network 106), which also includes a provider edge 102(4) (also denoted PE4) connected to source equipment 108. Source equipment 108 may be any content source that hosts and originates content, such as cable equipment, and broadcasts the content as broadcast/multicast traffic or unicast traffic in the form of Internet Protocol (IP) packets, for example. Provider edges 102(1)-102(4) and customer edge 101 may include network devices, such as network routers and switches, for example. EVPN instance 100 supports forwarding of the broadcast/multicast traffic and unknown unicast traffic originating from source equipment 108 to customer edge 101. In turn, customer edge 101 forwards the traffic to receiver equipment 110 for consumption. Receiver equipment 110 may include end user devices that can consume the content, such as cable set top boxes and computers In the example arrangement of FIG. 1, customer edge 101 is connected to multiple provider edges 102(1)-102(3) over Ethernet segment 104, thus the customer edge is said to be multi-homed to those provide edges. Modes of operation of EVPN instance 100 include an all-active multi-homing mode in which each of multi-homed provider edges 102(1)-102(3) is capable of forwarding traffic to customer edge 101, under certain conditions, as will be described below. In EVPN instance 100, provider edges 102(1)-102(3) and Ethernet segment 104 may be referred to as a "redundancy group" or "link aggregation group" (LAG), uniquely defined by the tuple <EVI, ESI>, which may implement redundant fail-over control and load-balancing with respect to traffic broadcast through network 106 to customer edge 101. In the ensuing description, the terms "multicast traffic" and a "multicast stream" may be regarded as interchangeable and synonymous.

EVPN instance 100 includes multiple multi-homed provider edges 102(1)-102(3), but only one of the provider edges assumes a primary role for forwarding given multicast traffic, i.e., a given multicast stream, originating from source equipment 108 to customer edge 101 at any given time. The provider edge in the redundancy group that serves the primary role for forwarding the multicast traffic to customer edge 101 is referred to as the "designated forwarder" (DF) of the redundancy group. As mentioned above, a conventional mechanism elects the DF at a high-level granularity, i.e., at the level of the tuple <ESI, EVI>. This ignores the group address G (e.g., group IP address) and the source address S (e.g., source IP address of source equipment 108) uniquely defining each multicast stream. Thus, conventionally, the DF forwards all multicast streams associated with the tuple <ESI, EVI>, regardless of their respective source and group address pair, denoted (S,G), which can waste bandwidth, limit bandwidth/load balancing, and reduce flexibility.

According to embodiments presented herein, EVPN instance 100 elects a DF among the redundancy group at a low level of granularity compared to the conventional mechanism. In one embodiment, the EVPN instance elects the DF as a function of the ESI, the EVI, and only a group address G, denoted (*,G), for multicast streams, i.e., based on the expanded tuple <ESI,EVI,G>. In another embodiment, EVPN instance 100 elects the DF at an even more granular level as a function of the ESI, the EVI, a group address G, and a source address S of a multicast stream, denoted (S,G), i.e., based on the expanded tuple <ESI,EVI, S,G>. Thus, the embodiments presented herein elect the DF for the <ESI, EVI> on a per (uniquely defined) multicast stream basis, i.e., as defined by (*,G), or by (S,G).

Figure 2:
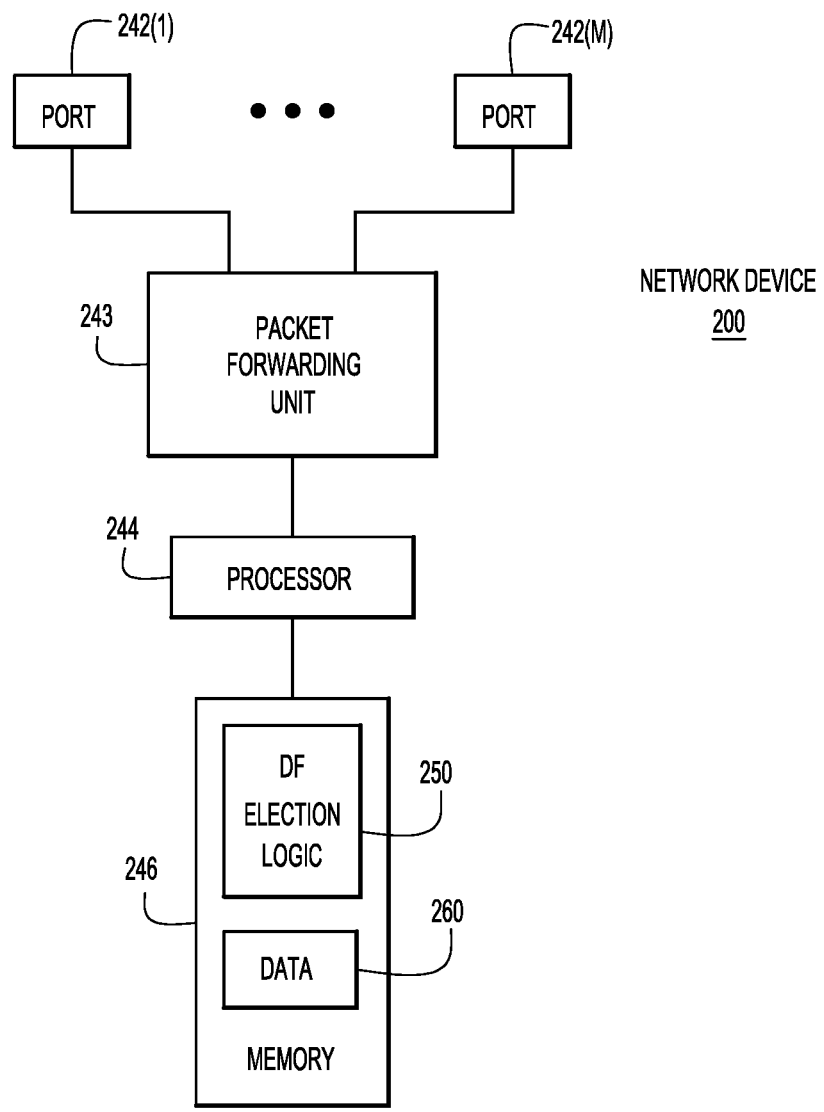
FIG. 2 is a block diagram of a network device configured to implement dynamic DF election for EVPN all-active homing on a per-multicast stream basis, according to an example embodiment.

With reference to FIG. 2, there is a block diagram of an example network device 200, representative of each of provider edges 102(1)-102(4) (also referred to as "provider edge devices" 102(1)-102(4)), configured to implement dynamic DF election for EVPN all-active homing on a per-multicast stream basis, either on the basis of (*G) or (S,G). Network device 200 comprises a plurality of network input/output (I/O) ports 242(1)-242(M) to send traffic (e.g., IP packets) to a network and receive traffic (e.g., IP packets) to the network, a packet forwarding/processing unit 243, a network processor 244 (also referred to simply as "processor"), and a memory 246. The packet forwarding/processing unit 243 is, for example, one or more application specific integrated circuits (ASICs) that include packet buffers, packet queues, and other control logic for performing packet forwarding operations. I/O ports 242 may be part of an Ethernet card having connection ports that enable communication over the network via the connection ports. Processor 244 is a microcontroller or microprocessor that is configured to perform higher level controls of switch 106. To this end, the memory 246 stores software instructions that, when executed by the processor 244, cause the processor 244 to perform a variety of operations including operations described herein. For example, the memory 246 stores instructions for DF Election logic 250 to perform operations described herein including methods 300-600, described below. Memory 246 also stores data 260 used and generated by logic 250. Such data may include DF candidate lists, bandwidth utilization thresholds, affinities, and so on, as will be described below.

As will be described below, provider edges PE1-PE3 of EVPN instance 100 elect a DF dynamically responsive to receipt of join requests, e.g., Internet Group Management Protocol (IGMP) joins, originated from receiver equipment 110 (also referred to more simply as the "receiver"), and forwarded by customer edge 101. Receiver 110 may originate the IGMP joins under either IGMP version v2 (IGMP v2) or IGMP version3 (IGMP v3). An IGMP v2 join is more generally referred to as a (*,G) join because the join expresses interest in traffic for group address G, but does not specify a source address. On the other hand, an IGMP v3 join may be more generally referred to as an (S,G) join because the join may express interest in traffic for group address G and for source address S. Provider edges PE1-PE3 may each implement the following methods of dynamic DF election per multicast stream:

a. Dynamic DF election based on (S,G) for a multicast stream initiated upon receipt of an (S,G) join from customer edge 101, as described in connection with FIG. 3;

b. Dynamic DF election based on (*,G) for a multicast stream initiated upon receipt of a (*,G) join from customer edge 101, as described in connection with FIG. 4; and c. Dynamic DF election based on (S,G) for a multicast stream initiated upon receipt of a (*,G) join from customer edge 101, and completed upon receipt of the actual multicast stream for (S,G) from source equipment S, as described in connection with FIG. 5.

Figure 3:
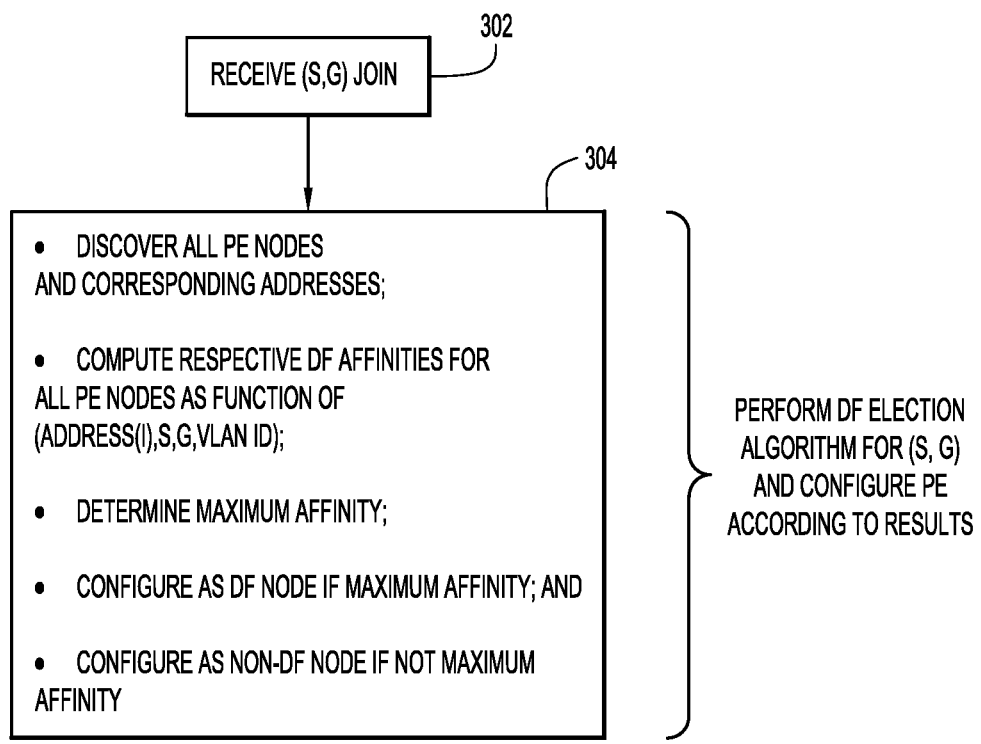
FIG. 3 is a flowchart of a method of dynamic DF election based on (source address (S), group address (G)) for a multicast stream, which is initiated based on an (S,G) join from customer edge, according to an example embodiment.

With reference to FIG. 3, there is a flowchart of an example method 300 of dynamic DF election based on (S,G) for a multicast stream initiated upon receipt of an (S,G) join from customer edge 101 (i.e., dynamic DF election method (a) above). Customer edge 101 may also be referred to as a customer edge device.

At 302, receiver 110 originates an IGMP v3 join (i.e., an (S,G) join). Customer edge 101 receives the join, and forwards the join to Ethernet segment 104, i.e., to the all-active multi-homed interface 104. The join is "synched" to each of provider edges PE1-PE3 of the redundancy group participating in the multi-homing mode of operation. That is, each of provider edges PE1-PE3 receive a copy of the join. Example procedures for the synch operation may be found in IEFT draft-ietf-bess-evpn-igmp-mld-proxy-00 located at https://tools.ietf.org/html/draft-ietf-bess-evpn-igmp-mld-proxy-00.

At 304, each provider edge PE among provider edges PE1-PE3 individually performs a DF election algorithm based on (S,G) as described below for sub-operations (a) and (b) to elect a DF. Each PE performs the same DF election algorithm that the other PEs perform in the redundancy group, more or less at the same time, i.e., in parallel, and configures itself with/based on a result of the DF election algorithm as performed at that PE. All of the PEs should arrive at the same result, i.e., determine/elect the same PE as the DF. Each PE programs/configures itself in accordance with the result. That is, each PE programs its data plane (i.e., programs an entry in a forwarding state table) as a forwarding state for (S,G) (meaning that the PE will forward a multicast stream for (S,G) received from network 106 to customer edge 101) if the result indicates that the PE is the DF, or as a drop state for (S,G) (meaning that the PE will drop the multicast stream for (S,G)) if the result indicates that the PE is not the DF. In other words, the PE configures itself as the DF or as a non-DF when the result indicates that the PE is the DF or is not the DF, respectively. In an example, PE1-PE3 each perform the same DF election algorithm, which yields a result indicating that PE2 should be the DF. PE2 programs itself as the DF for multicast stream (S,G), while PE1 and PE3 each programs itself as a non-DF for that multicast stream.

The DF election algorithm performed by each PE at operation 304 includes the following sub-operations:

a. The PE performs discovery of the redundancy group using any known or hereafter developed technique. The discovery technique may be as described in RFC 7432, which includes inter-PE signalling. Through the discovery, the PE discovers all other PE nodes in the redundancy group and their respective IP addresses. After the discovery, each PE knows the IP addresses of all of the PE nodes in the redundancy group. Then, each PE build/constructs an unordered list of the IP address of all the nodes in the redundancy group, referred to as a DF candidate list (i.e., each PE address on the DF candidate list represents a corresponding PE that may be elected as a DF for a given multicast stream). Assuming, the redundancy group includes N PE nodes, the DF candidate list includes each Address(i) including the address of the PE that performed the discovery, where $0<i<=N$. The DF candidate list does not need to be ordered, and the DF election algorithm is independent of how the actual DF candidate list is determined.

b. The PE determines which of the PEs in the redundancy group has a maximum "affinity" for the DF for (S,G, VLAN ID), and elects that PE as the DF. The respective affinity of PE(i) to (S,G, VLAN ID) is computed as a mathematical function:

affinity (S,G,VLAN ID, Address(i)), where
$0<i<=N$, PE(i) is the PE at ordinal i, address(i) is the IP address of PE at ordinal i.

More specifically:
affinity (S,G, Address(i))=(1103515245. ((1103515245.Address(i)+12345 XOR D(S,G,V-LAN ID))+12345) (mod 2^31), where
D(S,G,VLAN ID)=CRC_32(S,G,VLAN), and
CRC_32( ) is the CRC_32 for S, G and VLAN ID. Since the CRC_32 works on a block of data. The same function works for IPv4 and IPv6 addresses.

In the functions above, and in the similar functions below, the VLAN ID is an example of, and may be replaced by, any identifier that is the same among all of the participating PEs of the redundancy group. The identifier may be the VLAN ID, EVI, or an Ether Tag, for example, and is referred to more generally as an "identifier corresponding to the EVI." Generally, there is a one-to-one mapping between the VLAN and the EVI (i.e., "VLAN ID-EVI"), but this may not always be the case.

In the equations above, the CRC( ) function may be referred to as a first term and "(1103515245. ((1103515245.Address(i)+12345)" may be referred to as a second term based (only) on the Address(i), such that the affinity is an XOR of the first term and the second term. The above algorithm is related to rendezvous or highest random weight (HRW) hashing Summarizing sub-operation (b), the PE traverses the DF candidate list of Addresses and, for each Address(i), computes a respective affinity(i) of PE(i) for the DF as a mathematical function of (Address(i),S,G,VLAN ID), to produce a list of affinities, one for each PE in the redundancy group. In doing so, in the example of FIG. 1, each PE, acting individually and independently from the others, computes the same 3 affinities, an affinity of PE1 for the DF, an affinity of PE2 for the DF, and an affinity of PE3 for the DF. Then, the each PE individually and independently of the others determines the maximum or largest affinity among the affinities, and elects that PE as the DF. Assume, that the affinity of PE2 for DF is the largest. In the example of FIG. 1, each PE, acting individually and independently from the others, configures itself based on the affinities—PE1 programs drop for (S,G), PE2 programs forward for (S,G) because it has the largest affinity for the DF and is elected the DF for (S,G), and PE3 programs drop for (S,G).

Figure 4:
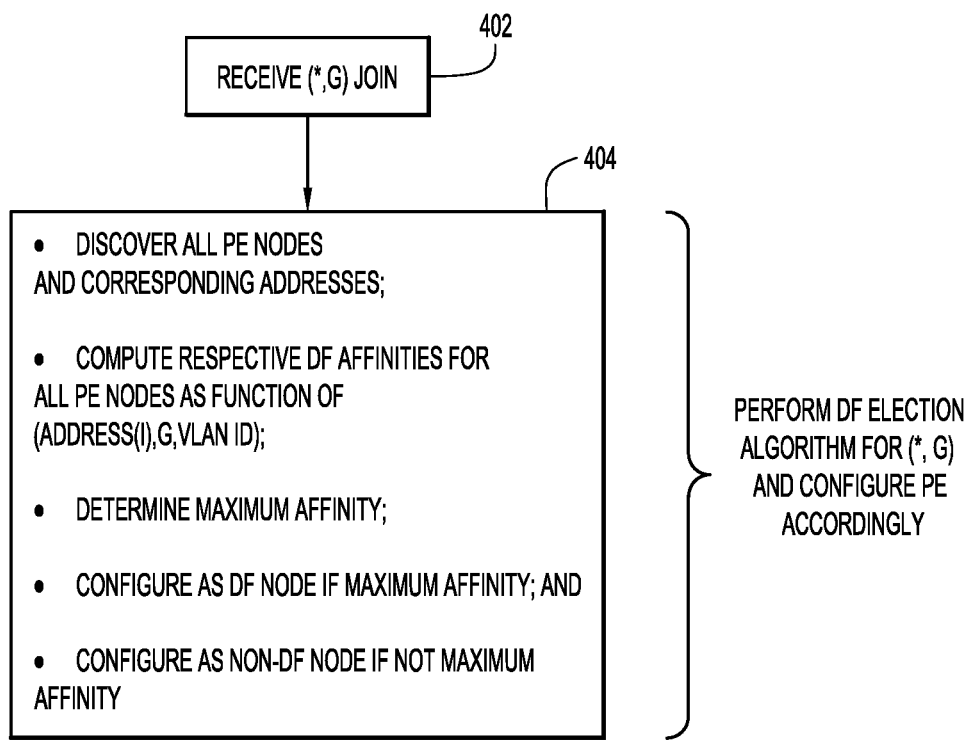
FIG. 4 is a flowchart of a method of dynamic DF election based on (*,G) for a multicast stream, which is initiated based on a (*,G) join from the customer edge, according to an example embodiment.

With reference to FIG. 4, there is a flowchart of an example method 400 of dynamic DF election based on (*,G) for a multicast stream initiated upon receipt of a (*,G) join from customer edge 101 (i.e., dynamic DF election method (b) above). Method 400 may be used when receiver 110 uses the IGMP v2 protocol, such that the IGMP v2 joins from receiver 110 carry only (*,G) (i.e., a group address G, but not source address). This means that receiver 110 expects multicast traffic/streams from any source address having group address G. Method 400 may also be used when receiver 110 uses the IGMP v3 protocol employs only a (*,G) join.

At 402, receiver 110 originates a (*,G) join. Customer edge 101 receives the join, and forwards the join to Ethernet segment 104, i.e., to the all-active multi-homed interface 104. The join is "synched" to each of provider edges PE1-PE3 of the redundancy group participating in the multi-homing mode of operation. That is, each of provider edges PE1-PE3 receive a copy of the join.

At 404, each PE among PE1, PE2, and PE3 individually performs a DF election algorithm based on (*,G), without source address S. The DF election algorithm based on (*,G) is similar to the DF election algorithm based on (S,G), except that the source address S is not used. Each PE performs the DF election algorithm based on (*,G), and then programs its data plane as forwarding state for (*,G) (meaning that the PE will forward all multicast streams for (*,G) received from network 106 to customer edge 101) if a result of the DF election algorithm based on (*,G) indicates the PE should be the DF for (*,G), or as drop state for (*G) (meaning that the PE will drop all multicast streams for (*,G)) if the result indicates the PE should not be the DF for (*,G).

The DF election algorithm based on (*,G) includes computing the affinities of the discovered PE Addresses for the DF according to the expression:

affinity (G, Address(i))=(1103515245. ((1103515245.Address(i)+12345) XOR D(S,VLAN ID))+12345) (mod 2^31), where
D(G,VLAN ID)=CRC_32(G,VLAN), and
CRC_32( ) is the CRC_32 for G and VLAN ID. Since the CRC_32 works on a block of data. The same function works for IPv4 and IPv6 addresses.

That is, the respective affinity of each PE for the DF is computed as a mathematical function of (Address(i),G, VLAN ID).

Figure 5:
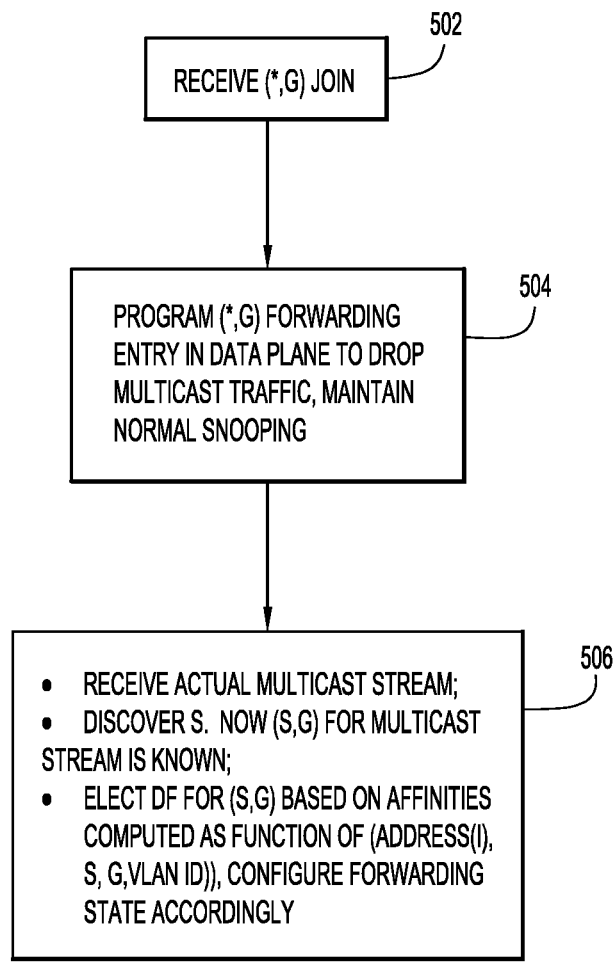
FIG. 5 is a flowchart of a method of dynamic DF election based on (S,G) for a multicast stream, which is initiated based on a (*,G) join, and then completed based on receipt of the multicast stream for (S,G) originated from source equipment, according to an example embodiment.

With reference to FIG. 5, there is a flowchart of an example method 500 of DF election based on (S,G) that is initiated upon receipt of a (*,G) join, and then completed upon receipt of an actual multicast stream from source 108, which provides the source address S missing from the (*,G) join. Method 500 is performed by each of provider edges PE1-PE3 in the redundancy group.

At 502, similar to 402, receiver 110 originates a (*,G) join. Customer edge 101 receives the join, and forwards the join to Ethernet segment 104, i.e., to the all-active multi-homed interface 104. The join is "synched" to each of provider edges PE1-PE3 of the redundancy group participating in the multi-homing mode of operation. That is, each of provider edges PE1-PE3 receive a copy of the join.

At 504, each PE programs a (*,G) forwarding entry in the data plane of the PE to drop all multicast traffic; however, the PE maintains an IGMP snoop state for the (*,G) forwarding entry as per normal IGMP snooping behavior. The PE waits to receive an actual multicast stream from network 106.

At 506, when each PE receives the actual multicast stream from network 106, each PE discovers a source address S of an active source of the multicast stream. Once source address S is discovered, each PE dynamically determines/elects a DF for (S,G) for the multicast stream, as described above in connection with operation 304. Each PE programs itself according to the result, i.e., as a DF or a non-DF, as described in operation 304. Method 500 advantageously allows DF election granularity at the level of the multicast stream (S,G) even if customer edge 101 can only support IGMP v2 (*,G) joins.

The embodiments described above elect a DF for a redundancy group per uniquely identified multicast stream, i.e., based on (*,G) or (S,G). Different PEs in the redundancy group may be elected as DFs for different multicast streams (*,G) and (S,G) based on different results of the affinity functions as defined above. The dynamic DF election may be refined further based on, or to account for, resource availability of the individual PEs of the redundancy group at any given time. This embodiment is referred to as "DF election based on resource availability."

Initially, a PE of the redundancy group may be able to take on an additional multicast stream as a DF; however, at any given time, a condition may arise under which the PE becomes resource constrained and is thus be unable to handle an additional multicast stream as a DF. For example, the PE may run out of link bandwidth, or a user defined policy constraint may prevent the PE from taking on the additional multicast stream. This condition is a trigger of the DF election based on resource availability, described below in connection with FIGS. 6 and 7.

Figure 6:
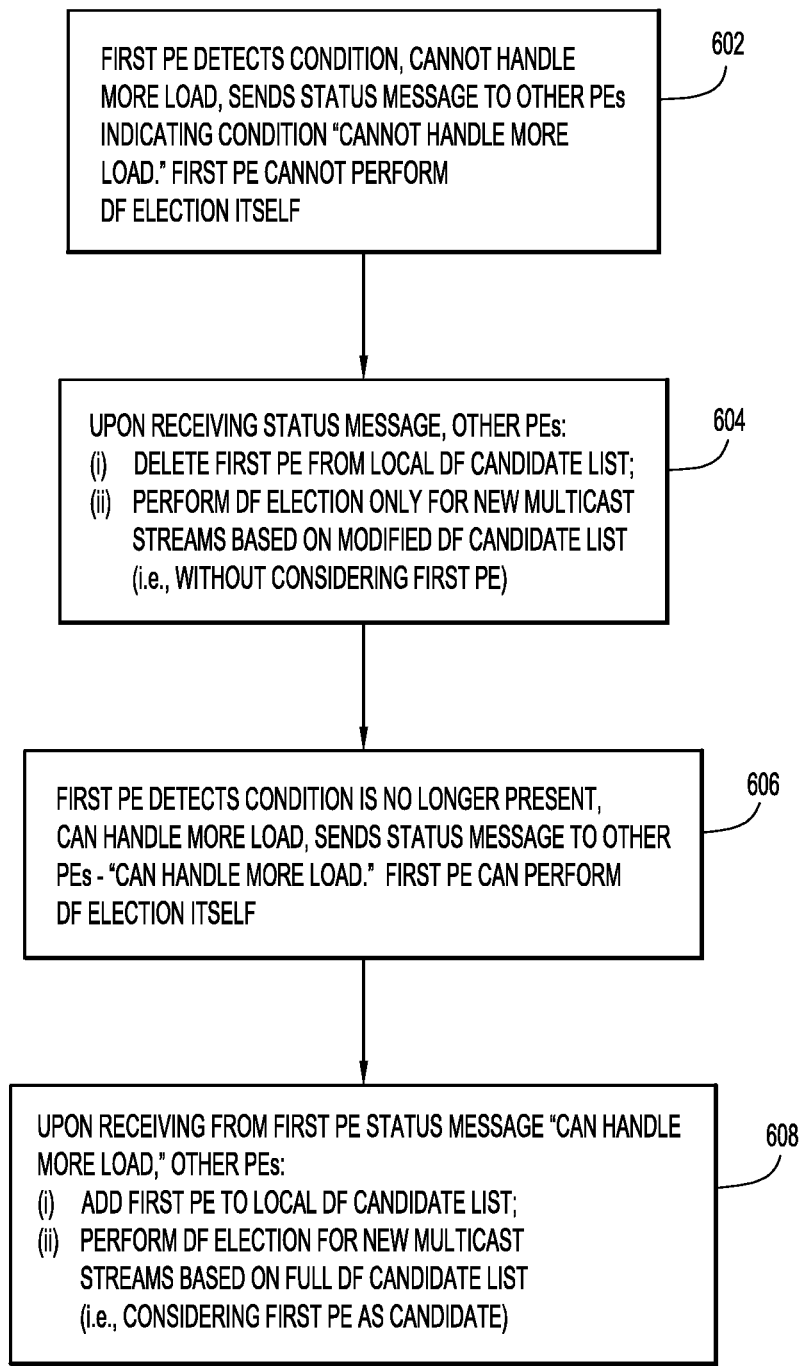
FIG. 6 is a flowchart of a method of DF election based on resource availability, according to an example embodiment.

With reference to FIG. 6, there is a flowchart of an example method 600 of DF election based on resource availability performed in EVPN instance 100.

At 602, the PE determines/detects one of the conditions mentioned above under which the PE is resource constrained and thus unable to become a DF for an additional multicast stream. For example, the PE may detect that the bandwidth utilization on a link between the PE and the customer edge is above a threshold bandwidth utilization resulting from existing multicast streams present on the link. Upon determining/detecting the condition, the PE sends to each of the other PEs of the redundancy group a status message indicating that the PE is unable to take on any new load, e.g., is unable to become a DF for an additional multicast stream. The status message includes at least (i) an identifier of the PE (e.g., a PE address), and (ii) a status flag/indicator set to indicate the PE is unable to take on any new load—"cannot take on any new load." In an example, the status message may take the form of a DF election extended message type-4 as defined in LEFT "draft-ietf-bess-evpn-df-election-02," but extended or modified to include the above-mentioned status indicator. While the condition persists, the PE operates in an "offline" mode with respect to any new multicast streams, i.e., the PE honors its current load, but will not take on any new load. That is, the PE programs a drop state for all new multicast streams, and does not become a DF for any new multicast stream.

At 604, each other PE of the redundancy group receives the status message from the PE that sent the status message at 602. Upon receiving the status message, each other PE removes from its existing DF candidate list the address(i) of the PE that sent the status message, leaving only the other PEs of the redundancy group on the DF candidate list, i.e., leaving a modified DF candidate list. After this, upon receiving a join for any new multicast stream (*,G) or (S,G), but not for an existing multicast streams for which a DF was previously elected, each other PE performs the DF election described above based on the modified DF candidate list from which the PE that sent the status message is omitted. Thus, each other PE of the redundancy group elects a (same) DF for the new multicast stream without considering the PE that sent the status message as a candidate.

At 606, when the PE determines/detects that the condition is no longer present, e.g., the bandwidth utilization on the link is no longer above the bandwidth utilization threshold, the PE sends to each of the other PEs in the redundancy group a status message indicating that the PE is able to take on a new load "can take on a new load." The status message includes the identifier of the PE and the status flag/indicator reset to indicate that the PE is able to take on a new load. While the condition is no longer present, the PE is able to take on a new multicast stream as DF, and performs the DF election methods described above. Thus, the PE operates ion an in-line mode with respect to new multicast traffic. When the PE switches between on-line and off-line modes for "new loads," it does so based on hysteresis in order to avoid rapid flip/flopping between modes.

At 608, upon receiving the status message sent at 604, each other PE adds to its existing DF candidate list the address(i) of the PE that sent the status message, i.e., modifies the DF candidate list to return the missing PE as a candidate for DF. After this, upon receiving a join for any new multicast stream (*,G) or (S,G), the PE that sent the status message at 604 and each other PE performs the DF election described above based on the modified DF candidate list to which the PE that sent the status message has been added.

Figure 7:
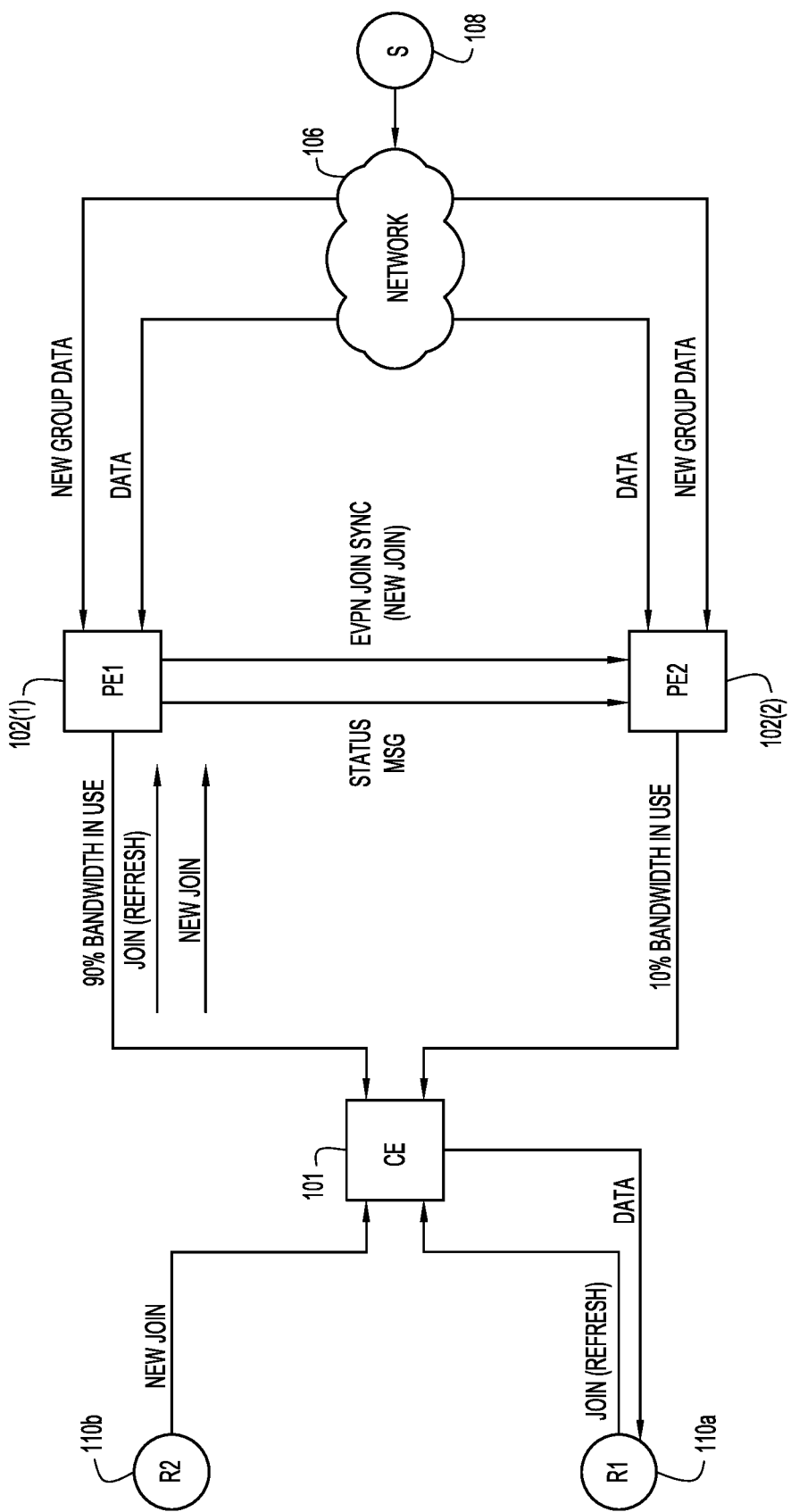
FIG. 7 is an illustration of the DF election based on resource availability as performed in the EVPN instance.

With reference to FIG. 7, there is an illustration of an example of method 600 as performed in EVPN instance 100. In FIG. 7, provider edges PE3 and PE4 are omitted for convenience. In the example of FIG. 7, provider edges PE1 and PE2 are multi-homed to customer edge 101, connected with receivers 110a (R1) and 110b (R2). Initially, (S1,G1), (S2,G2), (S3,G3), and (S4,G4) multicast flows are active, indicated as "Data" in FIG. 7. Provider edge PE1 is the DF for (S1,G1) and provider edge PE2 is the DF for (S2,G2). At a given point in time, provider edge PE1 determines that it is running out of resources, e.g., its bandwidth utilization on the link to customer edge 101 is at 90%, which exceeds a predetermined bandwidth utilization threshold. Alternatively, provide edge PE1 determines that it cannot add new load based on a user defined policy. Upon determining either of these conditions, the following operations are performed:

a. PE1 sends a status message to PE2 with an indicator/flag set to indicate that PE1 cannot take any more load.
  b. Upon receiving the status message, PE2 removes PE1 from the DF candidate list so that PE2 will not consider PE1 as a DF candidate for any new multicast flow as represented in a new join from customer edge 101.
  c. If PE2 receives a membership refresh message for an existing multicast flow having an existing DF (e.g., a join refresh from receiver R1 for any multicast flows in "Data"), PE2 does not need to re-run the DF election.
  d. IF PE2 receives new a membership report (S5,G5) for a new multicast stream (e.g., in a new join from receiver R2), PE2 runs the DF election without considering PE1, because PE1 is no longer on the DF candidate list.

PE1 remains omitted from the DF candidate list for all new joins, until PE1 clears/resets the status flag indicating that PE1 is able to handle new multicast flows, and sends the status message including the reset flag to inform PE2 that PE1 is now available for more load.

Figure 8:
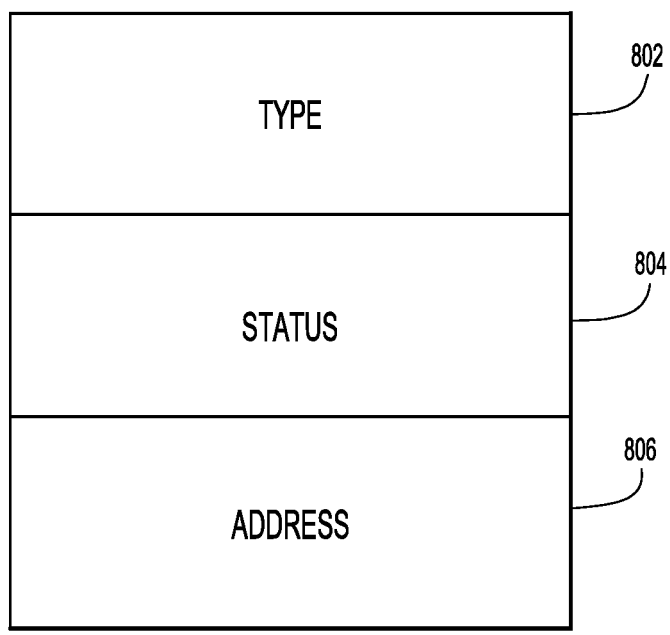
FIG. 8 is an illustration of a status message used by a provider edge to indicate to other provider edges of a redundancy group that the provider edge is able or unable to handle further multicast traffic.

FIG. 8 is an illustration of a format of an example status message 800 used by a provider edge to indicate the provider edge is able or unable to handle further multicast traffic. In an example, message 800 represents a DF election extended message type-4, extended or modified in accordance with the embodiments presented herein to include the above-mentioned status indicator.

Status message 800 includes a type field 802 to indicate that the message is a DF election status message, a status/flag field 804 set to indicate either the provider edge is able to handle more traffic or reset to indicate the provider edge is unable to handle more traffic, and an address field 806 to indicate one or more addresses of the provider edge, e.g., an IP address and/or media access control (MAC) address. Status message 800 may also include a destination address(es) for the message.

In summary, embodiments presented herein perform a dynamic method of determining a DF at a granularity of a multicast stream in an all-active EVPN based multi-homing mode. Embodiments also improve the load balancing characteristics of conventional DF election procedures. The embodiments include:

a. Dynamically learning the interest in a multicast stream and synchronizing it among the PEs of a redundancy group;
  b. Performing DF election per <ESI, EVI, (S,G)> using an HRW-based algorithm; and
  c. Joining the MCAST tunnel dynamically on demand based on the result of DF election or joining on both PE.

Advantages include perform improved distribution of multicast traffic even if membership is based on using IGMPv2 (*,G), and providing the capability to remove/add PEs as DF participants temporarily depending on network events and user defined policy.

In one form, a method is provided comprising: at a first provider edge of a redundancy group including multiple provider edges that are configured with an Ethernet virtual private network (EVPN) segment identifier (EVI) and an Ethernet segment identifier (ESI) and that are multi-homed to a customer edge: upon receiving from the customer edge a join request that includes a group address for a multicast stream, electing a designated forwarder for the multicast stream in the redundancy group, the electing including: computing for each provider edge a respective affinity for the designated forwarder as a mathematical function of at least a respective address of the provider edge, an identifier corresponding to the EVI, and the group address; determining which provider edge has a largest affinity among the affinities; and if the first provider edge has the largest affinity or does not have the largest affinity, configuring the first provider edge as the designated forwarder or not configuring the first provider edge as the designated forwarder for the multicast stream, respectively.

In another form, an apparatus is provided comprising: multiple network ports to communicate with a network; and a processor of a first provider edge of a redundancy group including multiple provider edges that are configured with an Ethernet virtual private network (EVPN) segment identifier (EVI) and an Ethernet segment identifier (ESI) and that are multi-homed to a customer edge, wherein the processor is coupled to the network ports and configured to: upon receiving from the customer edge a join request that includes a group address for a multicast stream, elect a designated forwarder for the multicast stream in the redundancy group, wherein the processor is further configured to: compute for each provider edge a respective affinity for the designated forwarder as a mathematical function of at least a respective address of the provider edge, an identifier corresponding to the EVI, and the group address; determine which provider edge has a largest affinity among the affinities; and if the first provider edge has the largest affinity or does not have the largest affinity, configure the first provider edge as the designated forwarder or not configuring the first provider edge as the designated forwarder for the multicast stream, respectively.

In yet another form, computer readable media is provided. The computer readable media is encoded with instructions that, when executed by a processor of a first provider edge of a redundancy group including multiple provider edges that are configured with an Ethernet virtual private network (EVPN) segment identifier (EVI) and an Ethernet segment identifier (ESI) and that are multi-homed to a customer edge, cause the processor to perform: upon receiving from the customer edge a join request that includes a group address for a multicast stream, electing a designated forwarder for the multicast stream in the redundancy group, the electing including: computing for each provider edge a respective affinity for the designated forwarder as a mathematical function of at least a respective address of the provider edge, an identifier corresponding to the EVI, and the group address; determining which provider edge has a largest affinity among the affinities; and if the first provider edge has the largest affinity or does not have the largest affinity, configuring the first provider edge as the designated forwarder or not configuring the first provider edge as the designated forwarder for the multicast stream, respectively.

In yet another form, a system is provided comprising: a customer edge; a redundancy group including multiple provider edges that are configured with an Ethernet virtual private network (EVPN) segment identifier (EVI) and an Ethernet segment identifier (ESI) and that are multi-homed to the customer edge; wherein upon receiving from the customer edge a join request that includes a group address for a multicast stream, each provider edge is configured to elect a designated forwarder for the multicast stream in the redundancy group, by: computing for each provider edge of the redundancy group a respective affinity for the designated forwarder as a mathematical function of at least a respective address of the provider edge, an identifier corresponding to the EVI, and the group address, to produce a list of affinities, one for each provider edge; determining which provider edge has a largest affinity among the affinities in the list of affinities; and if the provider edge has the largest affinity or does not have the largest affinity, configuring the provider edge as the designated forwarder or not configuring the first provider edge as the designated forwarder for the multicast stream, respectively.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a first provider edge of a redundancy group including multiple provider edges that are configured with an Ethernet virtual private network (EVPN) segment identifier (EVI) and an Ethernet segment identifier (ESI) and that are multi-homed to a customer edge:
    discovering the provider edges in the redundancy group and a respective address of each of the provider edges;
    upon receiving from the customer edge a join request that includes a group address for a multicast stream, at the first provider edge, electing in the redundancy group a designated forwarder for the multicast stream in parallel with other ones of the provider edges in the redundancy group performing the electing, the electing at the first provider edge including:
        computing for each provider edge a respective affinity for the designated forwarder as a mathematical function of at least the respective address of the provider edge, an identifier corresponding to the EVI, and the group address;
        determining which provider edge has a largest affinity;
        if the first provider edge has the largest affinity, configuring the first provider edge as the designated forwarder; and
        if the first provider edge does not have the largest affinity, not configuring the first provider edge as the designated forwarder, wherein one of the other ones of the provider edges that has the largest affinity is configured as the designated forwarder.

2. The method of claim 1, further comprising:
    prior to the computing, receiving a source address in addition to the group address for the multicast stream, wherein the computing includes computing for each provider edge the respective affinity as the mathematical function of the respective address of the provider edge, the identifier corresponding to the EVI, the group address, and the source address.

3. The method of claim 2, wherein the receiving the source address includes receiving the source address in the join request together with the group address.

4. The method of claim 2, wherein the receiving the source address includes receiving the source address in the multicast stream originated at a source of the multicast stream, not in the join request.

5. The method of claim 2, wherein the computing for each provider edge the respective affinity includes:
    computing a first term as a cyclic redundancy check over the group address, the source address, and the identifier corresponding to the EVI;
    computing a second term as a function of the respective address of the provider edge; and
    performing an XOR operation of the first term and the second term to produce the respective affinity.

6. The method of claim 2, further comprising, at the first provider edge:
    upon receiving from a second provider edge of the redundancy group a status message indicating that the second provider edge is unable to take on additional load, removing the second provider edge as a candidate for a designated forwarder, and, upon receiving from the customer edge a new join request to receive a new multicast stream defined by a new pair of group address and source address, repeating the electing a designated forwarder for the multicast stream for the new pair of group address and source address, without considering the second provider edge.

7. The method of claim 6, further comprising, at the first provider edge:
    upon receiving from the second provider edge a new status message indicating that the second provider edge is able to take on additional load, adding the second provider edge as a candidate for a designated forward, and, upon receiving from the customer edge a further join request to receive a further multicast stream defined by a further pair of group address and source address, repeating the electing a designated forwarder for the further multicast stream for the further pair of group address and source address including considering the second provider edge.

8. The method of claim 2, further comprising, at the first provider edge:
    upon determining a condition indicating that the first provider edge is unable to take on additional load, sending a status message to other provider edges of the redundancy group indicating that the first provider edge is unable to take on additional load, and not repeating the electing the designated forwarder responsive to a new join request for a new multicast stream; and
    upon determining the condition is no longer present, sending a new status message to the other provider edges of the redundancy group indicating that the first provider edge is able to take on additional load, and repeating the electing the designated forwarder responsive to a new join request for a new multicast stream.

9. The method of claim 1, wherein the computing for each provider edge the respective affinity includes:
    computing a first term as a cyclic redundancy check over the group address and the identifier corresponding to the EVI;
    computing a second term as a function of the respective address of the provider edge; and
    performing an XOR operation of the first term with the second term to produce the respective affinity.

10. The method of claim 1, wherein the respective address of each of the provider edges includes an Internet Protocol address.

11. The method of claim 1, wherein the identifier corresponding to the EVI includes the EVI or a virtual local area network (VLAN) identifier configured on the provider edges of the redundancy group.

12. An apparatus comprising:
    multiple network ports to communicate with a network; and a processor of a first provider edge of a redundancy group including multiple provider edges that are configured with an Ethernet virtual private network (EVPN) segment identifier (EVI) and an Ethernet segment identifier (ESI) and that are multi-homed to a customer edge, wherein the processor is coupled to the network ports and configured to:
discover the provider edges in the redundancy group and a respective address of each of the provider edges;
upon receiving from the customer edge a join request that includes a group address for a multicast stream, perform at the first provider edge an operation to elect in the redundancy group a designated forwarder for the multicast stream in parallel with other ones of the provider edges in the redundancy group that perform the operation to elect, wherein to perform the operation to elect, the processor is configured to:
compute for each provider edge a respective affinity for the designated forwarder as a mathematical function of at least the respective address of the provider edge, an identifier corresponding to the EVI, and the group address;
determine which provider edge has a largest affinity;
if the first provider edge has the largest affinity, configure the first provider edge as the designated forwarder; and
if the first provider edge does not have the largest affinity, not configuring the first provider edge as the designated forwarder, wherein one of the other ones of the provider edges that has the largest affinity is configured as the designated forwarder.

13. The apparatus of claim 12, wherein the processor is further configured to:
prior to the compute, receive a source address in addition to the group address for the multicast stream,
wherein the processor is configured to compute by computing for each provider edge the respective affinity as the mathematical function of the respective address of the provider edge, the identifier corresponding to the EVI, the group address, and the source address.

14. The apparatus of claim 13, wherein the processor is further configured to compute for each provider edge the respective affinity by:
computing a first term as a cyclic redundancy check over the group address, the source address, and the identifier corresponding to the EVI;
computing a second term as a function of the respective address of the provider edge; and
performing an XOR operation of the first term and the second term to produce the respective affinity.

15. The apparatus of claim 13, wherein the processor is further configured to:
upon receiving from a second provider edge of the redundancy group a status message indicating that the second provider edge is unable to take on additional load, remove the second provider edge as a candidate for a designated forwarder, and, upon receiving from the customer edge a new join request to receive a new multicast stream defined by a new pair of group address and source address, repeat the operation to elect a designated forwarder for the multicast stream for the new pair of group address and source address, without considering the second provider edge.

16. The apparatus of claim 15, wherein the processor is further configured to:

upon receiving from the second provider edge a new status message indicating that the second provider edge is able to take on additional load, add the second provider edge as a candidate for a designated forward, and, upon receiving from the customer edge a further join request to receive a further multicast stream defined by a further pair of group address and source address, repeat the operation to elect a designated forwarder for the further multicast stream for the further pair of group address and source address including considering the second provider edge.

17. A non-transitory computer readable medium encoded with instructions that, when executed by a processor of a first provider edge of a redundancy group including multiple provider edges that are configured with an Ethernet virtual private network (EVPN) segment identifier (EVI) and an Ethernet segment identifier (ESI) and that are multi-homed to a customer edge, cause the processor to perform:
discovering the provider edges in the redundancy group and a respective address of each of the provider edges;
upon receiving from the customer edge a join request that includes a group address for a multicast stream, at the first provider edge, electing in the redundancy group a designated forwarder for the multicast stream in parallel with other ones of the provider edges in the redundancy group performing the electing, the electing at the first provider edge including:
computing for each provider edge a respective affinity for the designated forwarder as a mathematical function of at least the respective address of the provider edge, an identifier corresponding to the EVI, and the group address;
determining which provider edge has a largest affinity; and
if the first provider edge has the largest affinity, configuring the first provider edge as the designated forwarder; and
if the first provider edge does not have the largest affinity, not configuring the first provider edge as the designated forwarder, wherein one of the other ones of the provider edges that has the largest affinity is configured as the designated forwarder.

18. The non-transitory computer readable medium of claim 17, further comprising instructions to cause the processor to perform:
prior to the computing, receiving a source address in addition to the group address for the multicast stream,
wherein the instructions to cause the processor to perform the computing include instruction to cause the processor to perform computing for each provider edge the respective affinity as the mathematical function of the respective address of the provider edge, the identifier corresponding to the EVI, the group address, and the source address.

19. The non-transitory computer readable medium of claim 18, wherein the instructions to cause the processor to perform the computing include instruction to cause the processor to perform:
computing a first term as a cyclic redundancy check over the group address, the source address, and the identifier corresponding to the EVI;
computing a second term as a function of the respective address of the provider edge; and
performing an XOR operation of the first term and the second term to produce the respective affinity.

20. The non-transitory computer readable medium of claim 18, further comprising instructions to cause the processor to perform:

upon receiving from a second provider edge of the redundancy group a status message indicating that the second provider edge is unable to take on additional load, removing the second provider edge as a candidate for a designated forwarder, and, upon receiving from the customer edge a new join request to receive a new multicast stream defined by a new pair of group address and source address, repeating the electing a designated forwarder for the multicast stream for the new pair of group address and source address, without considering the second provider edge.

* * * * *